United States Patent

[11] 3,604,527

[72] Inventor Warren H. Price
 Sheboygan, Wis.
[21] Appl. No. 880,479
[22] Filed Dec. 10, 1969
[45] Patented Sept. 14, 1971
[73] Assignee Gilson Bros. Co.
 Plymouth, Wis.
 Continuation of application Ser. No.
 672,095, Oct. 2, 1967, now abandoned.

[54] TRACTOR SUBASSEMBLY
 7 Claims, 8 Drawing Figs.
[52] U.S. Cl. .................................................. 180/64,
 180/85, 280/106
[51] Int. Cl. ...................................................... B60k 5/02
[50] Field of Search .......................................... 180/54.2,
 55–64, 1.5, 70, 85, 69; 56/25.4; 280/106

[56] References Cited
UNITED STATES PATENTS
1,353,245 9/1920 Johnson ........................ 180/54 (.2)
1,429,449 9/1922 Norelius ....................... 180/54 (.2) X
1,464,848 8/1923 Humphries ................... 180/54 (.2)
1,702,915 2/1929 Myers ........................... 180/1 (.5)
2,059,220 11/1936 Fernstrum .................... 180/64 UX
1,395,029 10/1921 Best .............................. 180/69.1
2,339,731 1/1944 Wheat et al .................. 180/69.1 X
FOREIGN PATENTS
550,059 12/1922 France ......................... 180/69.1

Primary Examiner—Leo Friaglia
Assistant Examiner—Milton L. Smith
Attorney—Wheeler, House & Wheeler ABSTRACT: A subassembly for a tractor, including a frame, engine base and rear drive unit. The drive unit is removably mounted on a rear raised section of the frame and consists of a removable package including a transaxle and mounting subframe. The engine base is integrated with a forward dropped section of the frame.

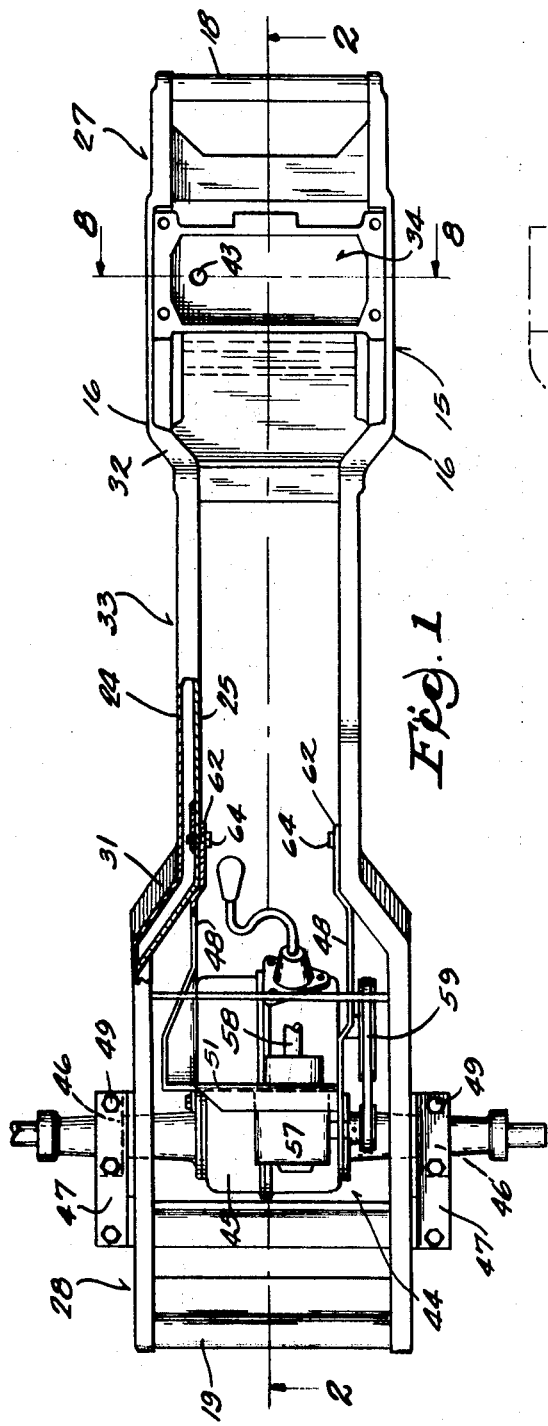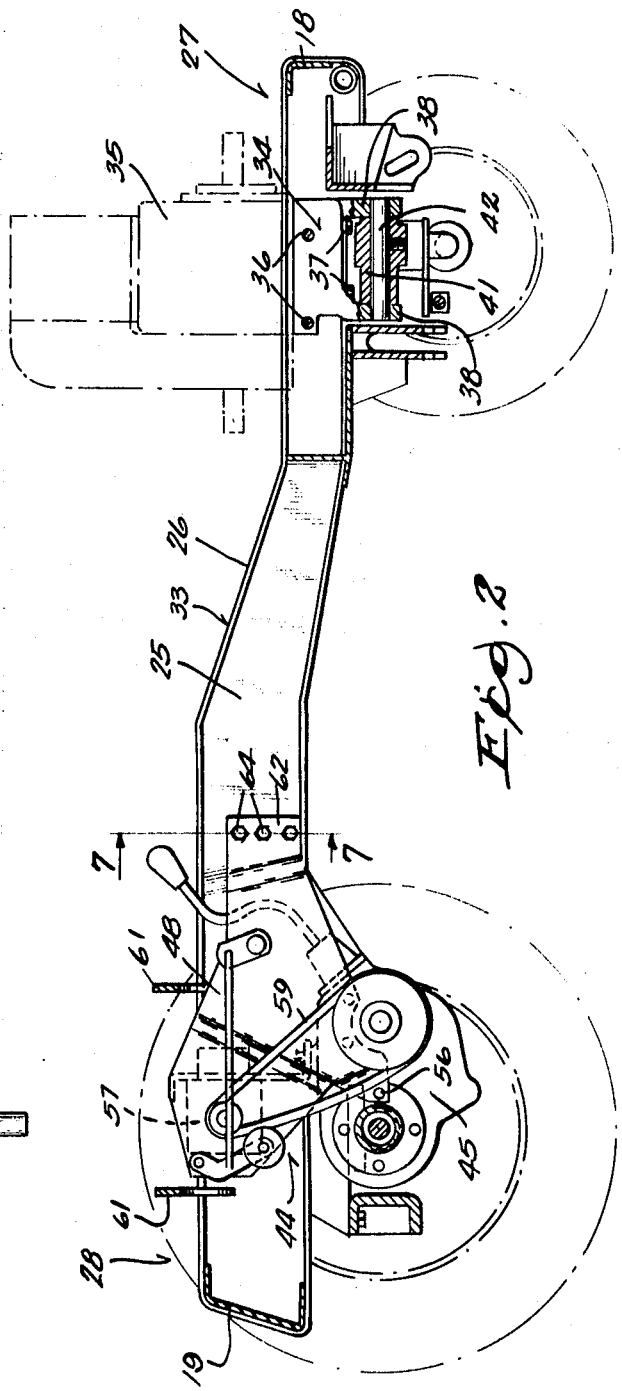

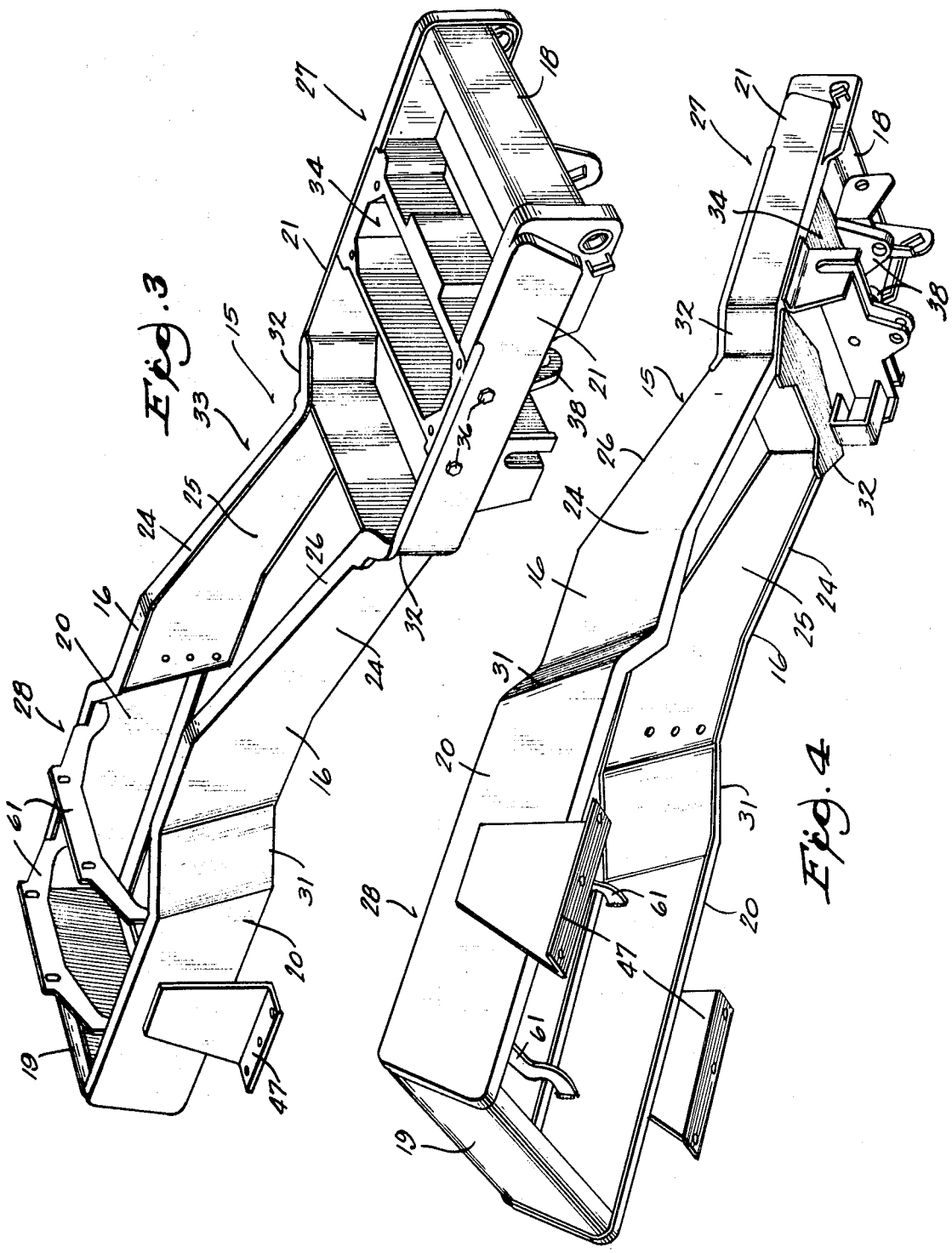

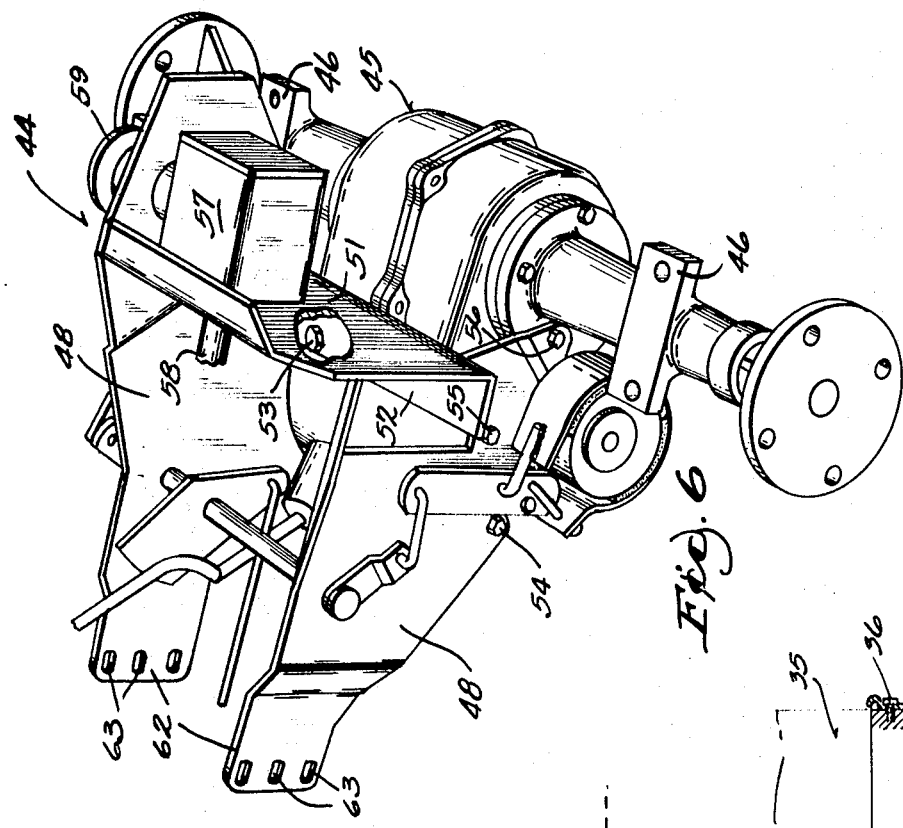
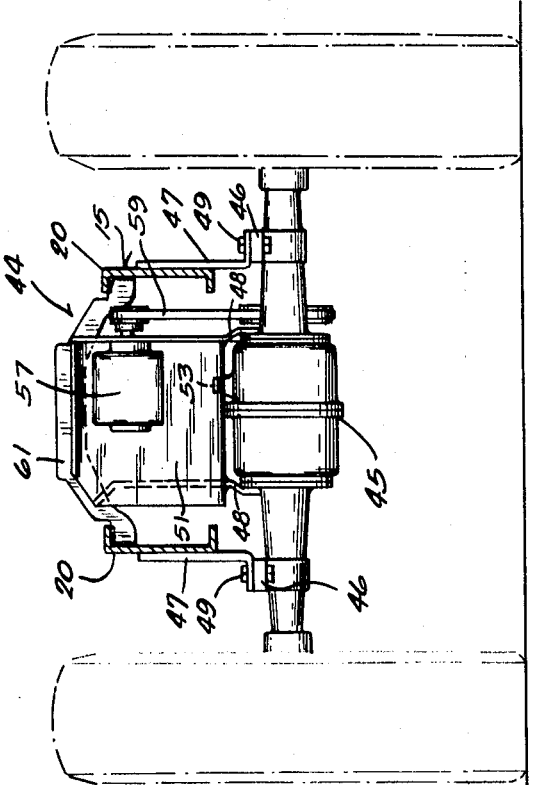
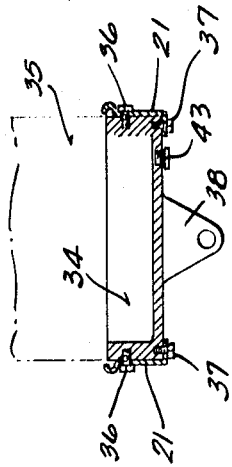
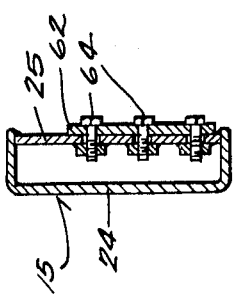

TRACTOR SUBASSEMBLY

CROSS-REFERENCE TO RELATED APPLICATION

Cross-reference is made to my copending U.S. Pat. application Ser. No. 652,567, filed July 11, 1967; now U.S. Pat. No. 3,483,684, granted Dec. 16, 1969, showing the frame incorporated in a tractor from which a mower is suspended. This application is a continuation of copending U.S. Pat. application Ser. No. 672,095, filed Oct. 2, 1967, now abandoned.

SUMMARY OF THE INVENTION

The tractor subassembly of the present invention includes a unitized frame having mirror image side beams with an elevated rear framework portion, a dropped front framework portion, and a tucked-in mid or waist portion through which the beams are box shaped in cross section. The front framework embraces an integral engine base which spans between the side beams to stiffen the frame. The engine base constitutes a hollow pan which is upwardly open to constitute an oil pan for the engine mounted on the base and has its bottom exposed beneath the frame for convenient oil drainage. The engine base also constitutes a mounting support for the front axle of the tractor.

The rear framework removably carries a package drive unit which is easily assembled and disassembled with respect to the frame. The drive unit includes a transaxle and mounting bracket having relatively long torque arms which are fastened at their ends to the box section portions at the mid portions of the frame. This connection is at a point considerably spaced from the frame portions adjacent the transaxle, thus to distribute torque stresses to the frame away from the transaxle. This construction results in a force dissipation system which avoids concentrating reaction torque force at the rear end of the frame and reduces the strength requirements of the frame needed to resist reaction torque from the transaxle.

Moreover, this construction facilitates assembly line techniques for assembling the transaxle with the frame. The rear drive unit package is simply slipped into the rear framework and a few bolts manipulated to connect the package drive unit to the frame.

Other objects, features and advantages of the invention will appear from the following disclosure.

DETAILED DESCRIPTION OF THE DRAWINGS

FIG. 1 is a plan view of the tractor subassembly.

FIG. 2 is a longitudinal section taken along the line 2—2 of FIG. 1 and including the rear drive unit and its integrated front engine base. The engine and wheels, which are not part of the subassembly, are shown in phantom.

FIG. 3 is a top perspective view of the unitized frame.

FIG. 4 is a bottom perspective view of the unitized frame.

FIG. 5 is a rear view of the subassembly.

FIG. 6 is a perspective view of the rear drive unit removed from the tractor subassembly.

FIG. 7 is a fragmentary cross section taken along the line 7—7 of FIG. 2.

FIG. 8 is a fragmentary cross section taken along the line 8—8 of FIG. 1.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The frame 15 (FIGS. 3 and 4) comprises two side beams 16 disposed in laterally spaced apart mirror image relationship. Beams 16 are cross-connected at their front ends by the crossbeam 18 and are cross-connected at their rear ends by the crossbeam 19. Beams 16 each have three portions, including rear channel portions 20 which are relatively deep in vertical direction and front channel portions 21 which are not as deep in the vertical direction. Interconnecting the channel portions 20, 21 is a mid channel portion 24 to the inside of which is welded cover plates 25 to constitute the beam portion which interconnects the rear framework with the front framework as a box section.

The mid portions 24, 25 of the side beams 16 are downwardly inclined at 26 (FIG. 2) so that the front framework 27 is at a lower level than the rear framework 28.

Moreover, the front and rear ends of the midportions 24 are provided with oblique offsets 31, 32 so that the midportion of the frame is tucked in at the waist 33 of the frame.

The geometry above described gives the frame 15 a very desirable shape for use in a riding tractor or mower of the type shown in my copending application aforesaid in that the midportion or waist 33 can be straddled by a rider, and there is ample room beneath the waist 33 beneath which a mower or like implement can be disposed.

The box sections 24, 25 of the waist portion 33 of the frame give the frame added strength and rigidity and provide a sturdy stress-distributing frame portion to receive the reaction thrust generated in the transaxle as hereinafter described.

Within the front framework 27, the side beam portions 21 embrace an engine base 34. Engine base 34 desirably comprises a heavy cast iron hollow oil pan for engine 35, shown in broken lines in FIG. 2. The engine base 34 spans laterally across the framework 27 to stiffen and reenforce the framework 27. The engine base 34 is detachably fastened in its nested or recessed position within the framework 27 by bolts 36, 37 (FIG. 8). The walls of the base 34 are vertical and are fastened by bolts 36 in face relation to the vertical side beams 21.

The undersurface of the engine base 35 is also provided with a pair of integrally cast brackets 38 on which the front axle 41 of the tractor is supported on the pintle 42 (FIG. 2). The pivot axis of pintle is longitudinal, and the axle 41 can tilt laterally thereabout. Accordingly, engine base 34 functions to support the engine, provide its crankcase oil pan, and provide a sturdy pivot bracket mounting for the front axle.

Engine base 34 has a drain plug 43 (FIG. 8) exposed at the undersurface of the frame by which oil may be drained from the engine pan.

In addition to the advantages just described, the recessing or nesting of the engine base 34 within the framework 27 lowers the center of gravity of the engine, reduces the combined height of frame and engine, and results in a more compact tractor.

The rear drive unit 44, shown separately in FIG. 6, comprises a transaxle 45 having upwardly facing mounting pads 46 which are aligned for detachable connection by bolts 49 with brackets 47 depending from the frame side beams 20 at the rear framework portion 28. The transaxle 45 is further provided with a subframe having side panels 48 which constitute torque-transmitting arms. Panels 48 are spanned by a crossplate 51 having bottom flange 52 by which this portion of the subframe is attached to the transaxle 45 by bolts 53. Panels 48 are also directly anchored to the transaxle by bolts 54, 55, 56, etc.

The crossplate 51 of the subframe also carries a gearbox 57 which receives power from engine 35 through a drive shaft 58 and supplies power to the transaxle through belt drive 59.

Other specific details of the drive and control mechanism will not be further described, as they are extraneous to the present invention.

The forward ends of panel torque arms 48 have laterally inset end pads 62 with bolt opening 63 by which the torque arms 48 are releasably attached by bolts 64 to the faceplates 25 of the box section side beam portions which constitute the midportion or waist 33 of the frame 15. As best shown in FIGS. 1 and 2, the bolts 64 connect the torque arms to the frame at a point remote from the wheel axle of the drive unit so that the framework 28 adjacent the drive axis is relieved from any concentration of reaction torque developed in the drive system. These forces are transmitted through the relatively long torque arms 48, 62 to the box section portion of the frame which is particularly sturdy and from which the forces are distributed throughout the frame without unduly stressing any part thereof.

The drive unit 44 is readily assembled with and removed from the frame 15 as a unit simply by nesting it within the framework 28 and manipulating bolts 64 and bolts 49. This is a relatively simple assembly operation and greatly facilitates mass production techniques in the assembly of the drive unit with the rear portion 28 of the frame 15.

Rear framework 28 may also be provided with bridging arches 61 to further reenforce rear framework 28 and support tractor portions above the framework 28.

What is claimed is:

1. A tractor subassembly comprising:
   a frame having mirror image side beams and front and rear frame portions connected by box section midportions of the beams,
   an engine base connected integrally across and inset between and embraced by the side beams at the front portion of the frame,
   and a rear drive unit comprising a transaxle and a subframe by which the transaxle is mounted on the rear of the frame, said subframe having torque arms fixedly engaged with the box section mid portions of the said frame beams to transmit reaction torque developed in the transaxle directly to said box section midportion.

2. The tractor subassembly of claim 1 in which the engine base constitutes an upwardly open engine oil pan having a bottom exposed at the undersurface of the frame.

3. The tractor subassembly of claim 1 in which the rear drive unit and its torque arms are nested within the side beams of the rear portion of the frame and is removable as a unit from the frame, the mounting of the transaxle to the frame being releasable for handling of the transaxle and subframe as a separate unit.

4. The tractor assembly of claim 1 in which the rear frame portion is elevated with respect to the front frame portion.

5. A tractor frame comprising mirror image side beams connected together to form a rigid framework, the rear portions of the framework being elevated with respect to the front portions of the framework, midportions of the beams comprising box sections interconnecting said front and rear framework portions, said midportion being inwardly offset from the sides of the front and rear framework portions to constitute a tucked in frame waist, the box sections being flared out at their ends to merge with the sides of the front and rear framework portions.

6. A tractor subassembly comprising a frame having a rear framework, a front framework and side beams interconnecting said front and rear framework and an engine base nested within said front framework, said engine base comprising an upwardly open engine oil pan having a bottom exposed at the undersurface of the frame and having a mounting bracket on which the front axle of the tractor is mounted.

7. A rear drive unit for assembly with a tractor frame having spaced side beams, said drive unit comprising a transaxle and a subframe, said subframe having torque arms nested between and extending along the side beams of the tractor frame and fastened to said beams at a point spaced from the transaxle to distribute torque stress away from frame parts immediately adjacent the axle, the side beams of the tractor having a box section midportion to which said drive unit subframe torque arms are fastened, the side beams of the tractor frame further having complementary mounting pads to which the axle-mounting pads are fastened, said pads being spaced from the point along the frame to which said torque arms are fastened.

Disclaimer 3,604,527.—*Warren H. Price*, Sheboygan, Wis. TRACTOR SUBASSEMBLY. Patent dated Sept. 14, 1971. Disclaimer filed Aug. 29, 1973, by the assignee, *Gilson Bros. Co.*

Hereby enters this disclaimer to claim 6 of said patent.

[*Official Gazette December 4, 1973.*]